United States Patent
Fromson et al.

(10) Patent No.: US 6,214,765 B1
(45) Date of Patent: Apr. 10, 2001

(54) CATALYST PRODUCT AND METHOD OF MANUFACTURE

(75) Inventors: Howard A. Fromson, Stonington; William J. Rozell, Vernon, both of CT (US)

(73) Assignee: Howard A. Fromson, Stonington, CT (US)

( * ) Notice: Subject to any disclaimer, the term of this patent is extended or adjusted under 35 U.S.C. 154(b) by 0 days.

(21) Appl. No.: 09/431,826

(22) Filed: Nov. 2, 1999

(51) Int. Cl.[7] .............................. B01J 23/10; B01J 23/40; B01J 23/72; B01J 21/00

(52) U.S. Cl. .................... 502/355; 502/302; 502/325; 502/330; 502/331; 502/332; 502/333; 502/334; 502/335; 502/527.24

(58) Field of Search ................................ 502/325, 330, 502/332, 331, 333, 334, 335, 355, 527.24, 302

(56) References Cited

U.S. PATENT DOCUMENTS

| | | | |
|---|---|---|---|
| 3,929,594 | 12/1975 | Fromson | 204/42 |
| 4,021,592 | 5/1977 | Fromson | 428/209 |
| 5,693,207 | 12/1997 | Fromson et al. | 205/112 |
| 5,833,931 | 11/1998 | Fromson et al. | 422/177 |
| 6,083,871 | * 7/2000 | Fromson et al. | 502/439 |

OTHER PUBLICATIONS

S. Wernick, P. Pinner and P.G. Sheasby, "The Surfacce Treatment and Finishing of Aluminum and its Alloys", Fifth Edition, vol. 2, Chapter 13, co–published by Finishing Publications Ltd. and ASM International, 1987 No Month.

* cited by examiner

Primary Examiner—Elizabeth D. Wood
(74) Attorney, Agent, or Firm—Alix, Yale & Ristas, LLP

(57) ABSTRACT

To form a catalytic surface, discrete metal nodules are electrolytically deposited onto the atmospheric oxide coating on an aluminum substrate. The nodules are formed from a catalyst metal or a core of another metal with a catalyst metal coating. The catalytic metal may be fully reduced by treatment with hydrogen gas.

7 Claims, 1 Drawing Sheet

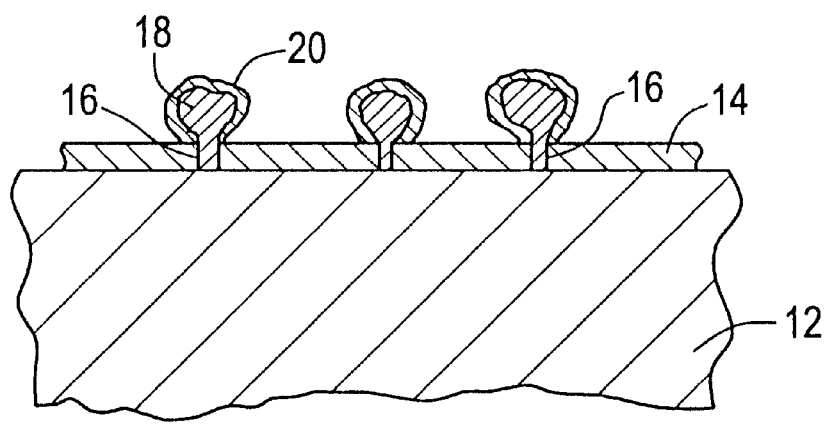

CATALYST PRODUCT AND METHOD OF MANUFACTURE

BACKGROUND OF THE INVENTION

This invention relates to a catalyst product and the method of manufacturing the product wherein discrete metal nodules formed from a catalyst metal or coated with a catalyst metal are formed on an atmospherically oxidized aluminum substrate.

U.S. Pat. Nos. 3,929,594 and 4,021,592 disclose an electroplated anodized aluminum article and a process for making such an article wherein an aluminum substrate has an unsealed porous anodic oxide layer formed on the substrate and then has a metal electrolytically deposited thereon to form discrete metal nodules having a root portion anchored in the pores of the anodic oxide layer and extending from the root portion above the surface of the anodic oxide layer. It is disclosed that the article in these patents can be a composite catalyst body by using a catalytically active metal to form the nodules which then serves as a catalyst, along with the catalytically active anodic aluminum oxide layer that is formed on the aluminum substrate.

One problem with forming catalysts according to the prior art of U.S. Pat. Nos. 3,929,594 and 4,021,592 is that some of the catalytically active metals which can be used to form the metal nodules are rare and expensive such as palladium, platinum, ruthenium, rhodium and other noble metals, as well as rare earth metals. In U.S. Pat. No. 5,693,207, it is disclosed that the nodules can be formed from a core of a less expensive metal and then coated with the expensive catalyst metal thereby reducing the quantity of expensive catalyst metal.

In all of these prior art catalyst preparation processes, it is required that the aluminum substrate be anodized which forms a relatively thick porous oxide coating. The electrodeposition of the metal nodules begins in the pores of the anodic oxide coating thereby anchoring the nodules into the pores. The thick porous anodic oxide coating and the anchoring of the nodules into the pores was always considered to be a necessity for forming discrete metal nodules which would adhere to an aluminum substrate. Although atmospherically oxidized aluminum can be plated, the plating process is not without some difficulties often requiring special plating process steps and materials. In this regard, reference is made to the publication, "The Surface Treatment and Finishing of Aluminum and its Alloys" authored by S. Wernich, P. Pinner and P. G. Sheasby, Fifth Edition, Volume 2, 1987, co-published by Finishing Publications Ltd. and ASM International and specifically to Chapter 13 (pages 989–1022) entitled "Plating of Aluminum". Even though atmospherically oxidized aluminum can be plated, there has been no recognition that discrete metal nodules could be effectively electrodeposited and anchored to an aluminum substrate which was not anodically oxidized and which only has a thin atmospheric oxide coating.

SUMMARY OF THE INVENTION

An object of the present invention is to form discrete nodules of a catalyst metal or another metal coated with a catalyst metal on an atmospherically oxidized aluminum substrate without any anodic oxidation. The nodules are electrodeposited onto the atmospherically oxidized aluminum substrate and the electrodeposition process is terminated when the nodules have been formed and before there is electrodeposited bridging between nodules. In a preferred embodiment, the deposited catalyst metal is subjected to treatment with hydrogen gas prior to use in the desired catalytic application.

BRIEF DESCRIPTION OF THE DRAWING

The drawing is an enlarged cross-sectional view depicting metal nodules formed on an atmospherically oxidized aluminum substrate with a catalyst metal coating on the core of the nodule.

DESCRIPTION OF THE PREFERRED EMBODIMENT

The present invention begins with a substrate of aluminum which may be ungrained or may be grained according to conventional prior art graining techniques. In either case, the aluminum substrate is cleaned such as by etching to remove milling oils and other residues. The substrate has an oxide layer which is the natural and very rapid result of exposure of aluminum to atmospheric oxygen. The thickness of the oxide layer formed by atmospheric oxidation is on the order of 25 to 50 Å whereas the anodic oxide coatings which are formed on the catalyst plates of the prior art as previously discussed are on the order of 5000 to 10,000 Å thick.

A further and significant difference is that the anodic oxide coatings contain pores which are rather uniformly spaced and rather uniform in diameter as a consequence of the electrolyte used in the anodic oxidizing process. By contrast, the natural formation of the atmospheric oxide layer inherently results in an oxide layer which is non-porous but which does contain cracks and fissures throughout. These cracks and fissures are a result of the metallurgical nature of the substrate and they are randomly spaced and non-uniform in size. Metallurgical grain boundaries and intermetallic particles of the aluminum substrate are exposed at the surface as a consequence of these cracks and fissures. These cracks and fissures are sites where the electrical resistance of the oxide film is reduced and are the likely sites at which electrodeposition is initiated. In a conventional plating process, the plating metal tends to deposit first at these sites and then bridge over between the initial deposits to form a continuously plated substrate.

According to the present invention, it has been discovered that the use of an electrodeposition process on atmospherically oxidized aluminum substrates wherein the process is limited in time to the formation of initial discrete nodules and not permitted to proceed to the stage of bridging between nodules produces nodules which are randomly distributed and firmly adhered to the aluminum. In other words, it has been discovered that it is not necessary to have a thick porous anodic oxide coating for the formation of discrete nodules and for the firm anchoring of these nodules to the substrate. The initial nodule formation is a function of the inherent nature of the atmospheric oxide layer. The electrodeposition begins at the sites of the cracks and fissures because of the lower resistance and then continues to deposit on those initial deposits to form the nodules. In the present invention, the electrodeposition is limited to those sites and then terminated.

In the formation of the catalyst plate of the present invention, the metal deposited onto the aluminum substrate to form the nodules can be any catalytic metal such as platinum, palladium, ruthenium, rhodium and other noble metals as well as rare earth metals. Alternately, the nodules can be formed with an initial core of a less expensive, even non-catalytic, metal such as copper with that metal core then plated with the expensive catalyst metal. This is shown in the drawing which is a cross-section of a portion of an article formed according to the present invention. The aluminum substrate 12 has an atmospheric oxide layer 14 containing the cracks or fissures 16. Electrolytically deposited metal nodule cores 18 are formed on the surface of the atmospheric oxide layer 14 with these nodule cores forming at the sites of the cracks or fissures 16. Electrolytically deposited onto the nodule cores is a coating 20 of the catalyst metal.

The size of the nodules is dependent on the duration of the electrolytic deposition process. In general, the desired nodule dimensions are sub-micron. The spacing or frequency of the nodules is a function of the random cracks and fissures in the atmospheric oxide coating and also a function of the electrolytic conditions as well as the particular aluminum alloy. Alloys with more inclusions and metallurgical grain boundaries are more likely to form a higher frequency of discontinuity in the atmospheric oxide film and thus more frequent nodules. Also, higher deposition voltages give rise to a greater number of deposition sites and thus more frequent nodules. With respect to the coating of the catalytic metal onto a nodule core, the catalytic coating should be as thin as practical to reduce cost. Since the catalytic process is a surface phenomenon, a monoatomic deposit would be sufficient. However, in practice, the coatings is on the order of 50 to 100 Angstroms thick to ensure complete coverage and help extend the catalyst life.

Strictly by way of example only, the following are the electrodeposition conditions for a copper nodule core, a platinum catalyst coating and a rhodium catalyst coating:

Copper Nodule Core

50g/l copper sulfate solution
ambient temperature
60 seconds
3 volts
1.5 amps

Platinum Catalyst Coating on Copper Core 10 g/l platinum plating electrolyte
(Platinum AP Solution from Technic, Inc. of Cranston, R.I.)
ambient temperature
120 seconds
3 volts
0.5 amps Rhodium Catalyst Coating on Copper Core 2.5 g/l rhodium trichloride hydrate
ambient temperature
30 seconds
3 volts
0.5 amps In a preferred embodiment, the catalytic metal is subjected to a treatment with hydrogen gas prior to use in the desired catalytic application. This treatment is intended to fully reduce the catalytic metal surface, and has been found to enhance the catalytic efficiency and lengthen the useful lifetime of the catalytic article. As an example, effective conditions for this treatment are a hydrogen flow rate of 30 ml/minute and a temperature of 450° C. for a duration of 3 hours. The following examples illustrate the formation of the catalytic plates with different catalytic metals and demonstrate the catalytic function:

EXAMPLE 1

An aluminum sheet was textured using a rotary nylon brush and an aqueous slurry of calcined alumina. Copper core nodules were formed on the surface and platinum was deposited on the copper core nodules under the conditions given described herein. The prepared article was treated with hydrogen gas at a flow rate of 30 ml/min and a temperature of 450° C. for 3 hours. A reaction mixture was prepared containing 2.5% carbon monoxide and 2.5% oxygen. At a flow rate over the catalytic surface of 60 ml/min and a temperature of 300° C., the carbon monoxide was 100% converted to carbon dioxide.

EXAMPLE 2

An aluminum sheet was textured and copper nodules were formed thereon as in Example 1 and rhodium was plated on the copper core nodules. The prepared article was treated with hydrogen gas as in Example 1. The reaction mixture of Example 1 was passed over this catalytic surface under the same conditions as in Example 1. The carbon monoxide was 100% converted to carbon dioxide.

EXAMPLE 3

A catalytic article was prepared as in Example 1 and subjected to the same hydrogen gas treatment. A gas stream containing 1 ppm of ozone was passed over the catalytic surface at ambient room temperature and a flow rate of 50 ml/min. The ozone was 100% converted to molecular oxygen.

As a comparison, an aluminum sheet was textured as in Example 1 but no copper core nodules or catalytic metal were deposited. The same reaction mixture as in Example 1 was passed over the surface under the same conditions and only 5.6% of the carbon monoxide was converted to carbon dioxide. A simple test of the adhesion of the nodules to the oxide coating by placing an adhesive tape, such as Scotch Magic brand tape, onto the plate and then peeling it off shows that the adhesion of the nodules on the atmospheric oxide coating is comparable to the adhesion on the anodic oxide coating.

What is claimed is:

1. A catalytic material comprising:
   a. an aluminum substrate having a non-porous atmospheric oxide layer thereon; and
   b. discrete metal nodules having catalytic metal surfaces electrodeposited onto said non-porous atmospheric oxide layer.

2. A catalytic material as recited in claim 1 wherein said nodules are formed entirely of a catalytic metal.

3. A catalytic material as recited in claim 1 wherein said nodules are formed with a non-catalytic metal core and a coating of catalyst metal thereon.

4. A catalytic material as recited in claim 3 wherein said metal core is copper.

5. A catalytic material as recited in claim 1 wherein said aluminum substrate is grained.

6. A method for producing a catalytic article comprising the steps of:
   a. providing an aluminum substrate with an atmospheric oxide coating thereon; and
   b. electrolytically depositing discrete metal nodules on said atmospheric oxide coating on said aluminum substrate, said discrete metal nodules having at least an outside surface of a catalytic metal.

7. A method as recited in claim 6 and further including the step of treating said catalytic metal by contact with hydrogen gas.

* * * * *